March 15, 1927. 1,620,946
A. F. BURGESS
LIGHT MOTOR TRUCK ATTACHMENT FOR HIGH PRESSURE SPRAYING
Filed July 16, 1925 2 Sheets-Sheet 1
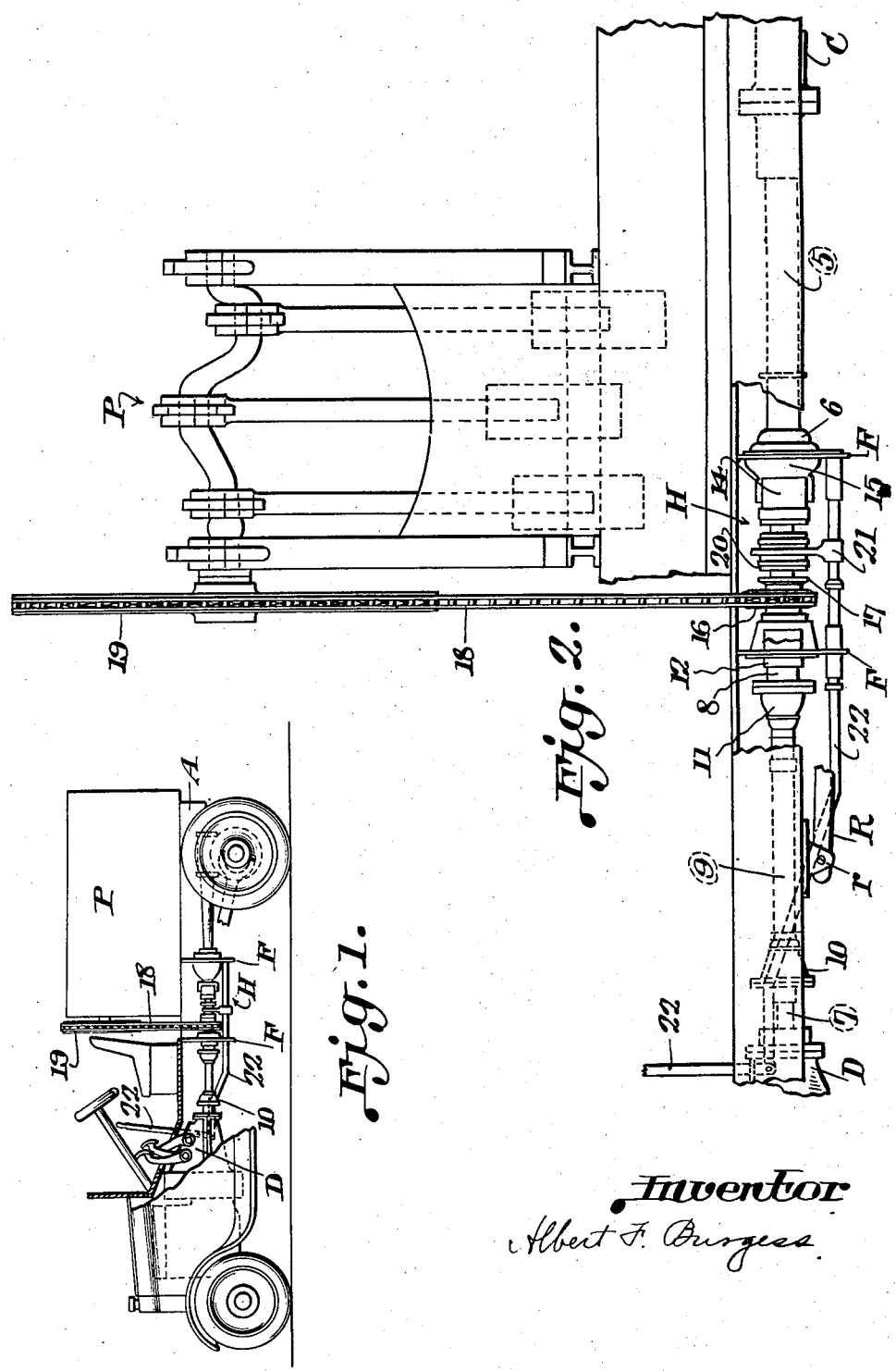
Inventor
Albert F. Burgess March 15, 1927.
A. F. BURGESS
1,620,946
LIGHT MOTOR TRUCK ATTACHMENT FOR HIGH PRESSURE SPRAYING
Filed July 16, 1925  2 Sheets-Sheet 2
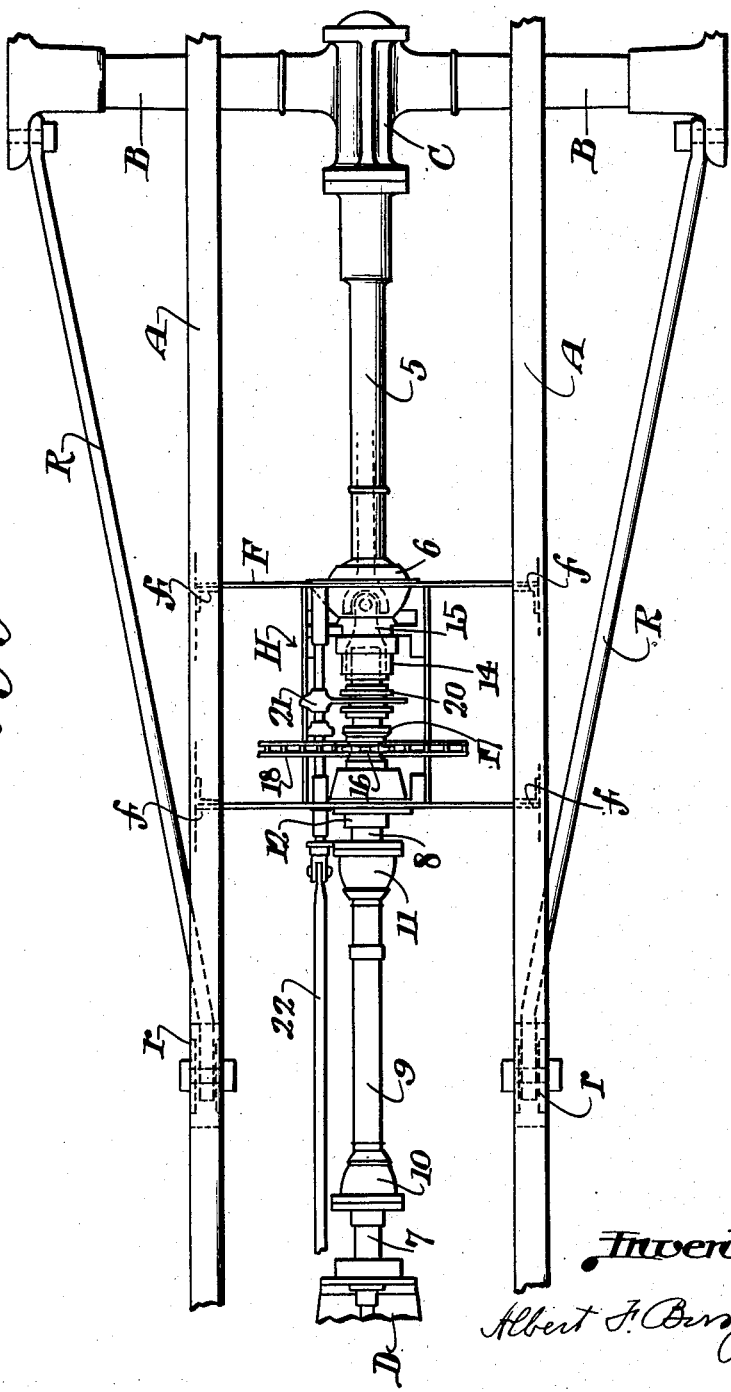

Patented Mar. 15, 1927.

1,620,946

UNITED STATES PATENT OFFICE.

ALBERT F. BURGESS, OF MELROSE HIGHLANDS, MASSACHUSETTS, DEDICATED, BY MESNE ASSIGNMENTS, TO THE PEOPLE OF THE UNITED STATES.

LIGHT MOTOR-TRUCK ATTACHMENT FOR HIGH-PRESSURE SPRAYING.

Application filed July 16, 1925. Serial No. 44,127.

(GRANTED UNDER THE ACT OF MARCH 3, 1883; 22 STAT. L. 625.)

This application is made under the act of March 3, 1883, chapter 143 (22 Stat. 625) and the invention herein described and claimed may be used by the Government of the United States or any of its officers or employees in the prosecution of work for the Government, or by any citizen of the United States, without payment to me of any royalty thereon.

This invention relates to improvements in power transmission for automobiles and has for an object to provide selective means for operating auxiliary devices carried by the automobile.

This device is particularly adapted for application to an automobile of a popular type, and is designed as an attachment to such vehicle, though not necessarily restricted to this use. A further object is, therefore, to produce a relatively cheap and efficient device which may be readily incorporated in a standard automobile structure, with the minimum labor and expense.

With this and other objects in view, as may become apparent from the following disclosure, the invention consists in the novel combination of elements, construction and arrangement of parts, operation and specific features to be hereinafter enlarged upon and recited in the subjoined claim, the invention being illustrated in the accompanying drawings, wherein:

Fig. 1 is a side elevation showing an application of my device to an automobile;

Fig. 2 is a side elevation, parts being broken away; and

Fig. 3 is a plan.

Referring to the drawings A is the chassis frame mounted upon the rear axle housing B and including the differential C and the power unit D. Radius rods R attached as usual to the rear axle housing are attached at $r$ to the frame.

Mounted intermediate the power unit and the rear of the frame is a cross frame F secured at $f$ to the side members of the main frame and supporting a power transmission assembly H to be more particularly described hereinafter.

In the application of my device to an automobile I find it convenient to shorten the drive shaft and its housing 5 by cutting out a portion in the middle, and rewelding the ends and mounting the universal joint 6 in the rear member of the supplemental frame F. I further find it convenient to insert a new section of the drive shaft 7 connecting at the forward end with the power unit in the usual manner, and at the rear end with the section of drive shaft 8 in the power transmission assembly H. This section includes a Spicer joint 9 having a universal 10 at the forward end and a universal joint 11 at the rear end.

The section of drive shaft 8 is supported at its forward end where it passes through the cross frame by a suitable housing 12 and extends toward the rear to a point within the clutch member 14 running freely therein. This clutch member is supported by a suitable housing 15 and connects with the universal 6 aforesaid.

Mounted intermediate the frame members is a sprocket 16 freely revoluble on the shaft 8 and having a clutch face 17 toward the rear. The sprocket carries a chain 18 connecting with a sprocket 19 for operating an auxiliary device carried by the automobile such as a pump P.

A double faced clutch 20 keyed to the drive shaft 8 may be shifted by the shifting fork 21 and its operating means 22 allowing the clutch to be engaged either with the drive sprocket 16 or with the clutch member 14.

From the foregoing description it will thus be seen that the operator by manipulating the clutch control to shift the clutch 20 forwardly into contact with the clutch face 17 may utilize the motive power of the automobile to drive any auxiliary mechanism mounted on the chassis; or by shifting the same rearwardly into contact with the clutch member 14 may drive directly through the power assembly from the power unit to the rear wheels.

The Spicer joint is interposed between the power unit and the power transmission assembly H to allow the drive shaft to lengthen when thrown out of horizontal alignment by loading of the truck and the other units of the device are designed to create a thoroughly efficient, cheap, and readily applied structure.

As the sprocket runs freely on the power shaft of the power transmission assembly no brake is needed to hold stationary any auxiliary mechanism operated from it through its chain, but when said auxiliary mechanism is being operated it has been found advisable, in order to hold the car stationary while the motor is running at high speed connected with said mechanism, to provide a new connection (not shown) with the emergency brake with separate rod and lever.

While in the foregoing I have described specific embodiments and have mentioned only certain possible modifications it will be appreciated that in practice I do not limit myself to such specific details as herein set forth, but may resort to any modifications falling within the scope of the claim.

I claim:

The combination of mechanism for operating an automobile and auxiliary devices, including a motor, a drive shaft extending toward the rear of the automobile, a telescoping shaft carrying universal joints at each end thereof attached to the rear end of said drive shaft, a clutch-carrying shaft attached to the rear of said telescoping shaft supported in suitable bearings and carrying near its rear end a double-faced sliding jaw clutch keyed to said clutch-carrying shaft and adapted to be shifted longitudinally, a driven shaft supported in suitable bearings concentric with and to the rear of said clutch-carrying shaft and having on its forward end jaws adapted to engage with the jaws of the rearward face of the double-faced clutch, a universal joint attached to the rear end of said driven shaft, a shaft adapted to drive the rear axle of the automobile attached at its forward end to the last aforesaid universal joint, a sprocket freely revoluble on the clutch-carrying shaft and having a clutch face toward the rear adapted to be engaged by the front face of the aforesaid double-faced clutch, means for shifting said double-faced clutch forward and backward so as to engage either or neither of the clutch faces of the sprocket and driven shaft, and a chain carried by said sprocket connecting with another sprocket for operating auxiliary devices.

ALBERT F. BURGESS.